June 17, 1952 C. H. HOEPPNER 2,600,405

SELECTIVE COMMUNICATION SYSTEM

Filed March 18, 1946 3 Sheets-Sheet 1

INVENTOR.
CONRAD H. HOEPPNER

BY M. O. Hayes

ATTORNEY

June 17, 1952 C. H. HOEPPNER 2,600,405

SELECTIVE COMMUNICATION SYSTEM

Filed March 18, 1946 3 Sheets-Sheet 2

INVENTOR.
CONRAD H. HOEPPNER

BY M. A. Hayes

ATTORNEY

June 17, 1952 C. H. HOEPPNER 2,600,405

SELECTIVE COMMUNICATION SYSTEM

Filed March 18, 1946 3 Sheets-Sheet 3

INVENTOR.
CONRAD H. HOEPPNER

BY M. O. Hayes

ATTORNEY

Patented June 17, 1952

2,600,405

UNITED STATES PATENT OFFICE 2,600,405

SELECTIVE COMMUNICATION SYSTEM

Conrad H. Hoeppner, Washington, D. C.

Application March 18, 1946, Serial No. 655,356

7 Claims. (Cl. 177—353)

(Granted under the act of March 3, 1883, as amended April 30, 1928; 370 O. G. 757)

This invention relates broadly to communication apparatus and in particular to method and circuits useful in selective or coded communication.

In both wired and wireless communication, advantage is widely taken of frequency selective circuits at the receiver to accept intelligence endowed energy of a particular frequency or a particular band of frequencies and to reject energy of all other frequencies. In certain instances, and in particular in control signal communication it is desirable to achieve a still higher order of selectivity so that the receiver is not held responsive to a particular frequency regardless of its source In control signal communication for example, single frequency selectivity may require a discrete frequency for each control. For a multiplicity of controls, a wide section of the frequency spectrum may be required in order to secure the necessary discrimination between signals. Any one of the controls is subject to actuation by energy of its corresponding frequency regardless of the source of that energy, a condition which, particularly in radio control systems, leads to erratic control.

It is possible to avoid erratic operation to a large extent and to actuate a number of discrete controls greater than the number of frequencies employed by providing a plurality of frequency selective circuits at the receiver in such a manner that only energy which is of a plurality of frequencies will be accepted to actuate a given control. While such combination coding is advantageous as compared with simple single frequency selectivity, it fails to achieve the same efficiency of utilization of frequencies as a coding system in which, for each control, there must not only be a plurality of frequencies, but the necessary frequencies must appear in a particular order in a particular time relationship. Such a system of coding may be called "time permutation" coding or simply "permutation" coding.

It is an object of this invention to provide method and aparatus for permutation coding.

It is another object of this invention to provide method and apparatus for signal discrimination on the basis of frequency composition.

It is another object of this invention to provide method and apparatus for accepting or rejecting an input signal in accordance with its frequency occurrence characteristics.

It is another object of this invention to provide a circuit which responds to produce an output signal only to a particular plurality of signals applied in a particular order within a predetermined interval of time.

Other objects and features of this invention will become apparent upon a careful consideration of the following detailed description when taken together with the accompanying drawings in which.

In a communication system in which each item of intelligence is conveyed by a plurality of frequency components, mere combination of those components limits their common used to only one intelligence item. If, however, permutation be employed, the common use of a plurality of frequencies may result in a number of discrete arrangements each of which may correspond to a different item of intelligence. For example, three different frequencies, which, in combination, yield only one arrangement, in time permutation, yield six arrangements.

Figure 1:
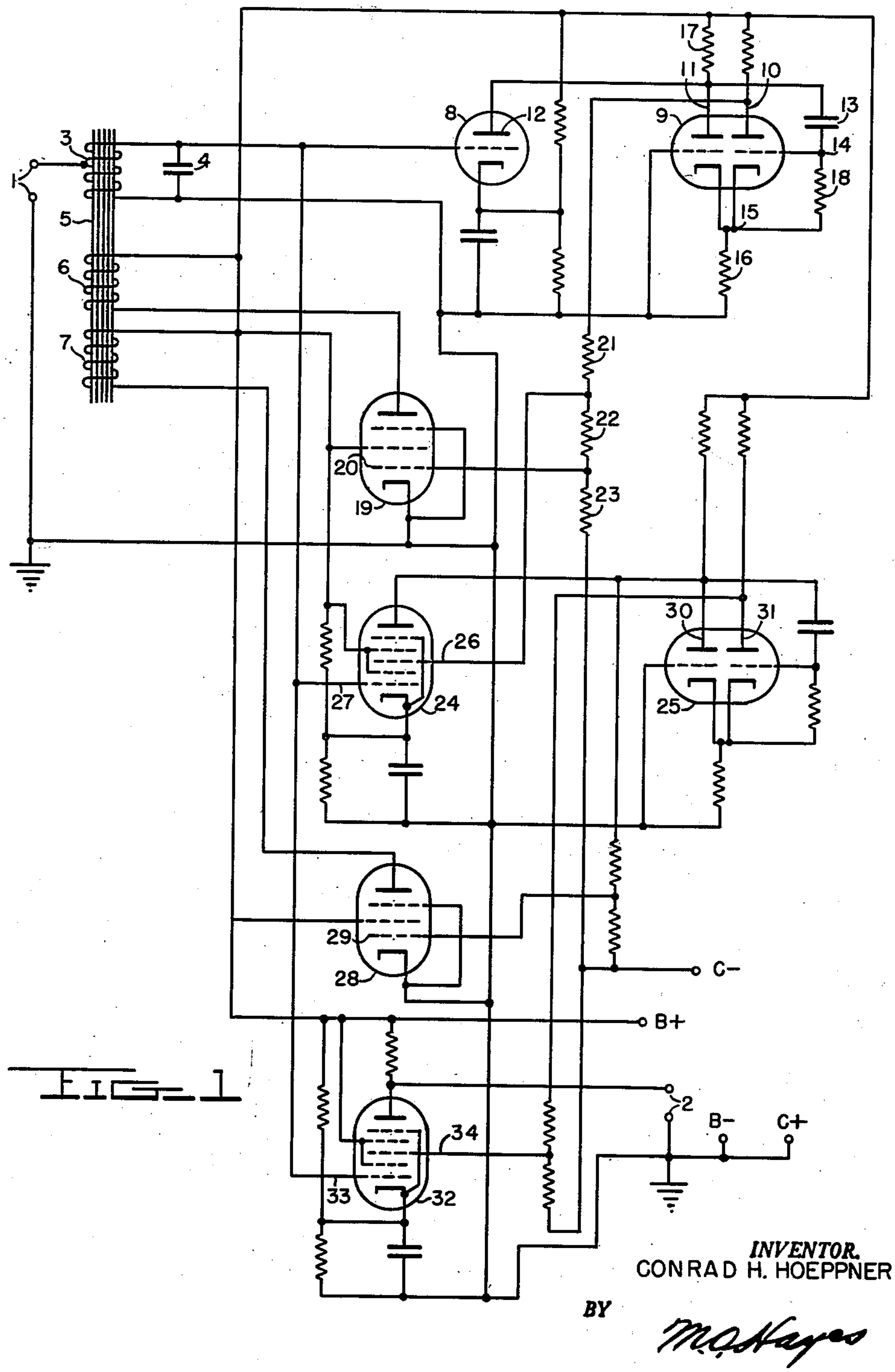
Fig. 1 is the circuit diagram of one exemplary embodiment of this invention.

Reference is now had to Fig. 1, the circuit diagram of apparatus for time permutation coding constructed according to the teachings of this invention. A signal comprising energy of three frequencies $F_1$, $F_2$, and $F_3$ occurring in a predetermined time order must be applied at input terminals 1 in order to produce an output signal at output terminals 2. In this embodiment the input signal is applied to a frequency selective input circuit comprising parallel inductive branch 3 and capacitive branch 4. Inductive winding 3 has a core 5 of magnetic material, such as silicon steel, or one of various available alloys of iron nickel and cobalt, or powdered iron. On this core 5 are two other windings 6 and 7. With this construction, the flux resulting from the flow of current in windings 6 and 7 affects the flux density within core 5 with respect to winding 3. Since the flux density is changed, the permeability is reflected in a corresponding change in the "A. C." or incremental inductance of winding 3. While the precise relationships involved border on the recondite to the extent that the design of coils with magnetic cores normally includes an element of cut and try, it may be said in general that a magnetizing force accompanying a steady flow of current in winding 6 or winding 7 decreases the incremental inductance of winding 3. When no current flows in winding 6 or winding 7, winding 3 contributes its highest value of inductance to the parallel circuit which it forms with capacitive element 4. Under such a condition, the resonant frequency of the parallel circuit is at its lowest value. If current flows in either winding 6 or winding 7, the resonant frequency of the parallel circuit is increased by an amount which depends largely upon the number of turns in those windings and by the magnitude of the current. Thus the current through those winding may be controlled to effect a change in the resonant frequency of the parallel circuit.

Tubes 8 and 9 represent the vacuum tube components of a self returning switching or multivibrator means for producing a time interval defining gating voltage which appears as a positive excursion at plate 10 of tube 9 and as a negative excursion at plate 11 of tube 9. In particular, tube 8 is a normally non-conducting tube held so by positive cathode bias. It will, however, conduct to produce a negative signal at its plate 12 when a signal applied at input terminal 1 comprises energy of a frequency which develops the resonant frequency response of the parallel circuit comprising inductive winding 3 and capacitance 4. Such a negative signal at plate 12 of tube 8 is communicated through capacitor 13 to grid 14 of tube 9.

The right hand element of tube 9 of which plate 10 is a part is normally conducting since grid 14 is normally at the same potential as cathode 15. The normal (quiescent) flow of current through the right hand element of tube 9 holds the left hand element, of which plate 11 is a part, non-conducting by virtue of the bias generated across resistor 16. A negative signal at grid 14, such as that supplied by tube 8, reduces the cathode bias on the left hand element of tube 9 permitting it to conduct and reverse the conditions of conduction and non-conduction within tube 9 for a definite interval of time. This normal cathode coupled self-returning multivibrator action is, of course, accompanied by the appearance of a positive gating voltage at plate 10 (right hand element non-conducting) and of a negative gating voltage at plate 11 (left hand element conducting). The duration of these gating voltages is determined essentially by the interval of time required for capacitor 13 to discharge sufficiently for the right hand element of tube 9 to resume conduction. This interval may be fixed within wide limits substantially by choice of capacitor 13 and resistors 17 and 18 in its discharging circuit.

Tube 19 is connected in series with winding 6 on magnetic core 5 and represents a means of controlling the current which flows through winding 6. To maintain a high "Q" in the resonant circuit 3, 4 it is preferably that tube 19 be of the pentode variety. Grid 20 of tube 19 is so connected to the voltage divider comprising resistors 21, 22, and 23 between plate 10 of tube 9 and (C−) potential that tube 19 may only conduct when the right hand element of tube 9 is non-conducting, i. e. during the generation of the gating voltage.

Tubes 24 and 25 are the vacuum tube components of a second multivibrator means for producing a time interval defining gating voltage similar in all respects to the means comprising tubes 8 and 9 except that tube 24 is a dual control tube requiring positive signals on both grid 26 and grid 27 simultaneously before a negative keying signal is applied to tube 25 to institute the generation of the gating voltage. Grid 27 receives the resonant circuit output of the parallel circuit comprising winding 3 and capacitance 4 while grid 26 holds tube 24 non-conducting except during the interval defined by the positive gating voltage appearing at plate 10 of tube 9.

Thus it will be seen that no signal may reach tube 25 except during the existence of the gating voltage produced by tube 9 and that during that gating voltage the frequency required to develop the resonant frequency response of the parallel circuit and thus apply a keying signal to tube 25 through tube 24 is changed by the flow of current through winding 6.

Tube 28 is a current controlling means responsive to the gating voltage produced by tube 25 in much the same manner as tube 19 is responsive to the gating voltage produced by tube 9 and is also preferably of the pentode variety. In this particular embodiment, tube 28 is a normally conducting tube so that its action is to stop the flow of current in winding 7 and thus decrease the resonant frequency of the parallel circuit comprising winding 3 and capacitance 4 during the interval of time defined by tube 25 gating voltage. This action is accomplished by connecting grid 29 of tube 28 to plate 30 of tube 25 rather than to plate 31. A negative, rather than positive gating voltage is thus applied to tube 28 during the interval defined by the operation of the second multivibrator means.

Tube 32 is a dual control or coincidence tube so negatively biased at both grids 33 and 34 that positive signals must be applied simultaneously to both grids in order to cause it to conduct and produce a negative output signal at terminals 2. Grid 33 is arranged to receive the resonant frequency response of the parallel circuit of winding 3 and capacitance 4 while grid 34 is responsive to the positive gating voltage generated at plate 31 of tube 25. It will be seen that the resonant frequency response of the parallel circuit will cause tube 32 to conduct to produce an output signal only during the existence of the gating voltage produced by tube 25 and that, during the existence of that gating voltage, the signal frequency developing that resonant frequency response will be decreased by the stoppage of current flow through winding 7.

In operation and in the absence of an applied signal at input terminals 1, the right hand elements of tubes 9 and 25, and tube 28 are conducting while the remainder of the tubes are non-conducting. The resonant frequency $F_1$ of the parallel circuit comprising winding 3 and capacitance 4 is thus fixed by the flow of current through winding 7 at a value different from resonant frequency $F_3$ (that which is fixed by the circuit elements in the absence of current flow through either winding 6 or winding 7). From the earlier explanation of the action of the plural windings on magnetic core 5, frequency $F_1$ is thus greater than $F_3$.

Let it be assumed that a signal of frequency $F_1$ having maximum peak amplitude limited in value by suitable preceding limiter circuits is applied to terminals 1. This signal develops the resonant frequency response of the parallel circuit, tube 8 produces its keying signal, and tube 9 proceeds to generate its gating voltage. During the interval defined by this gating voltage, tube 19 conducts to alter the resonant frequency of the parallel circuit to a value $F_2$ (corresponding to current flow in both winding 6 and winding 7). Also during this interval, tube 24 is unbiased at grid 26 and is ready to receive a signal from the parallel circuit. Now let it be assumed that, during this interval, a signal of frequency $F_2$ is applied to terminals 1. This signal develops the resonant frequency response of the parallel circuit, tube 24 produces its keying signal and tube 25 proceeds to generate its gating voltage. The circuit elements associated with tube 9 are so chosen that the gating voltage generated by tube 9 is of a duration just sufficient to allow the signal of $F_2$ frequency to place tube 25 in operation. Thus, the gating voltages produced by the two multivibrator means overlap very little in time and during the interval defined by tube 25 gating voltage, tube 19 is cut off (its quiescent state) and tube 28 is also cut off (by the gating voltage of tube 25). During the tube 25 interval, the parallel circuit has a resonant frequency $F_3$ and tube 32 is unbiased at grid 34 ready to receive a signal from the parallel circuit on grid 33. Now let it be assumed that, during this last interval, a signal of frequency $F_3$ is applied at terminals 1. This signal develops the resonant frequency response of the parallel circuit and tube 32 is caused to conduct to produce an output signal at terminals 2.

In summary of the foregoing operation, a signal comprising three different frequencies $F_1$, $F_2$, and $F_3$, having a time occurrence in the order named and having a time relationship such that frequency $F_2$ was applied at terminals 1 during the interval defined by the first multivibrator means (tubes 8 and 9) and such that frequency $F_3$ was applied at terminals 1 during the interval defined by the second multivibrator means was necessary in order to produce an output signal at terminal 2. In this embodiment $F_3$ represented the lowest frequency (no current flow in either winding 6 or winding 7), $F_2$ represented the highest frequency (current flow in both winding 6 and winding 7) and $F_1$ represented an intermediate frequency (current flow in winding 7 only). This arrangement $F_1$, $F_2$, and $F_3$ is only one of the six possible permutations of these three frequencies.

To illustrate circuit arrangements for a different code, for example where $F_1$ is low, $F_2$ intermediate and $F_3$ high, it is merely necessary to change the connection of grid 29 so that it goes to anode 31 instead of anode 30. Thus the low frequency $F_1$ will reverse the conductive conditions of the trigger circuit of tube 9 bringing tube 19 to conduction to draw current through winding 6. When this happens the reduced inductance renders the ciruit sensitive to the intermediate frequency $F_2$ to alter the condition of the trigger circuit of tube 25, thereby bringing tube 28 to conduction through winding 7. With conduction thus established through both windings 6 and 7, the circuit is adjusted to the highest frequency and with tube 32 unblocked at grid 34, output signals can be realized. It is at once apparent for this that the unstable period of the trigger circuit of tube 9 must persist for at least the duration of the $F_2$ and $F_3$ signal periods.

It should be noted that the circuit will not be actuated if the chosen signal frequency combination of $F_1$, $F_2$, $F_3$, etc. occur simultaneously because the limited input signal will not contain individual components of sufficient amplitude to operate the circuits associated with tubes 9 and 25.

Figure 2:
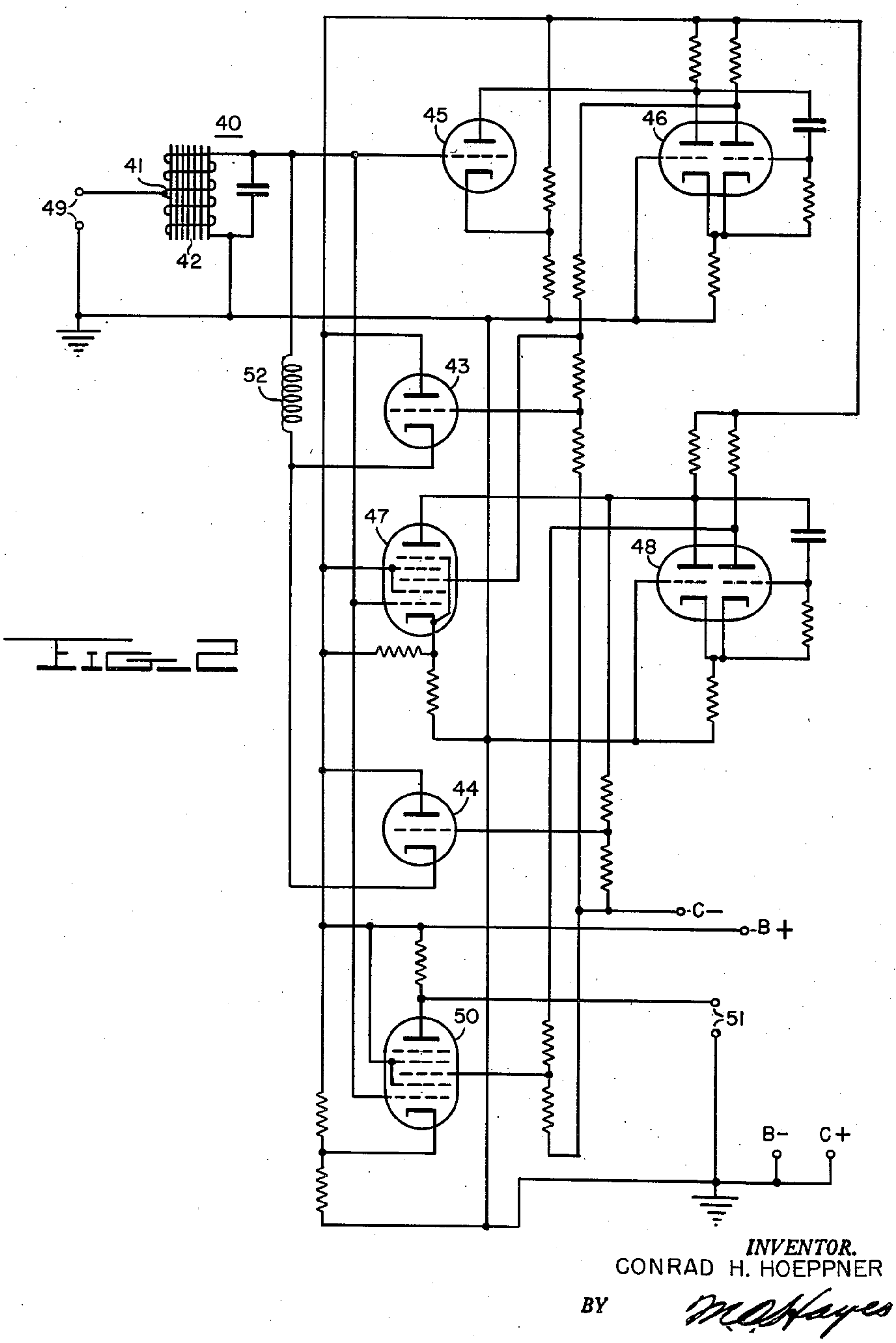
Fig. 2 is the circuit diagram of a variant embodiment of this invention.

In Fig. 2 is shown a variant embodiment of this invention whose principal difference from the embodiment shown in Fig. 1 lies in input resonant circuit 40. Winding 41 has a magnetic core 42 and undergoes changes in its incremental inductance by virtue of the passage of current directly through it rather than through discrete magnetically linked windings as in the case of the embodiment of Fig. 1. Current controlling tubes 43 and 44 are connected in parallel with each other and in series with winding 41. When they are caused to conduct, they superpose a "D. C." flux on the inductance to change the resonant frequency of parallel circuit 40 in accordance with the operation of the first multivibrator means (tubes 45 and 46) and the second multivibrator means (tubes 47 and 48). An input signal comprising energy of three frequencies occurring in a predetermined order must be applied at input terminals 49 in order to cause tube 50 to conduct and produce an output signal at terminals 51. The same permutations are possible in this embodiment as were possible in the embodiment of Fig. 1. A radio frequency choke 52 in series with the current controlling tubes 43 and 44 and winding 41 has been found of value in preventing premature triggering of the subsequent multivibrator means or coincidence tube by the sudden starting of conduction by the current controlling tubes and to prevent loading of the resonant circuit 40 by tubes 43, 44.

Figure 3:
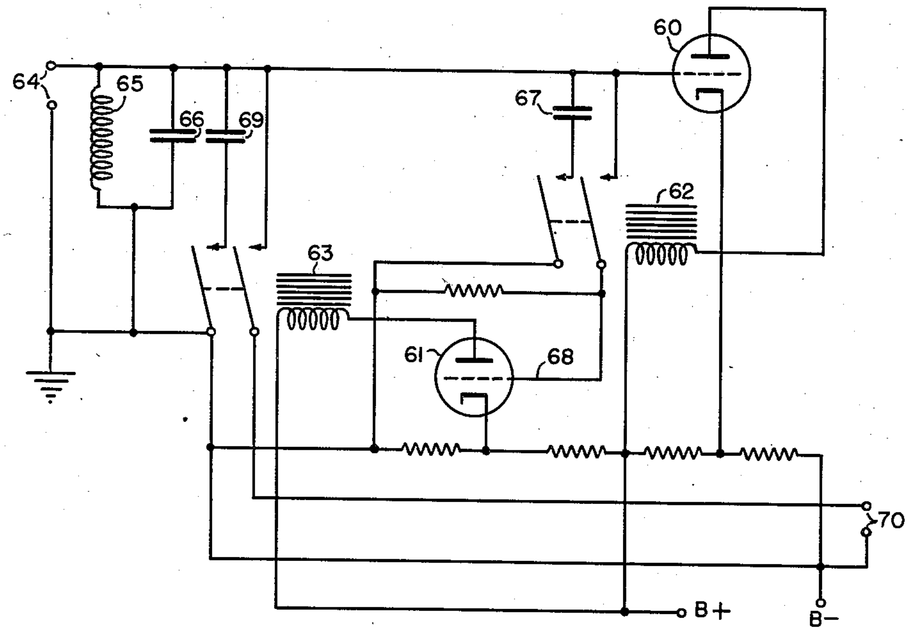
Fig. 3 is the circuit diagram of another variant embodiment of this invention.

In Fig. 3, to which reference is now had, is shown a variant embodiment in which the capacitance rather than the inductance of the input circuit is changed by each succeeding frequency element of an input signal. In this embodiment, both tubes 60 and 61 are normally non-conducting. Each has in its plate circuit a respective double contact, normally open, slow release, relay 62 and 63. These relays are energized to close their contacts only when the particular tube with which they are associated is caused to conduct. Once energized by a momentary signal, the relays require an interval of time to de-energize (i. e., slow release) which extends beyond the existence of the momentary signal. In operation, an input signal comprising energy of three frequencies $F_{11}$, $F_{12}$, and $F_{13}$ of descending value and in that order may be applied to input terminals 64. Frequency $F_{11}$, of the value required to develop the resonant frequency response of the parallel circuit comprising inductance 65 and capacitance 66, unbiases tube 60 and thereby energizes relay 62. Relay 62, in closing its contacts, adds capacitance 67 to capacitance 66 to alter the resonant input frequency to $F_{12}$. It also connects grid 68 of tube 61 to the input circuit so as to ready it for the next frequency element of the incoming signal. This element, frequency $F_{12}$, develops the resonant frequency response of the input circuit and unbiases tube 61 to close relay 63. Relay 63, in closing its contacts, adds capacitance 69 to capacitances 66 and 67 to alter the resonant input frequency to $F_{13}$. It also connects the upper of output terminals 70 to the input circuit so as to ready it for $F_{13}$, the final frequency element of the incoming signal. Frequency $F_{13}$ at input terminals 64 develops the resonant frequency response of the input circuit and this is communicated to output terminals 70 to constitute the output signal. It will be apparent to those versed in the art that a wide variety of changes may be made in the foregoing circuits, none of which exceed the teachings of this invention. Such changes as providing a plurality of input circuits each of a particular frequency and each rendered responsive in turn rather than a single circuit the resonant frequency of which is altered as each signal element is received will be seen to be an obvious variation.

Since certain further changes may be made in the foregoing constructions and different embodiments of the invention may be made without departing from the scope thereof, it is intended that all matter shown in the accompanying drawings or set forth in the accompanying specifications shall be interpreted as illustrative and not in a limiting sense.

The invention described herein may be manufactured and used by or for the Government of the United States of America for governmental purposes without the payment of any royalties thereon or therefor.

What is claimed is:

1. A permutation coding circuit comprising, a saturable core reactor, a capacitance connected with said saturable core reactor forming a parallel resonant circuit therewith, means for applying incoming signals to said parallel circuit, a sequence of means each for changing, for an interval of time, the degree of saturation of said saturable core reactor in response to the resonant frequency output of said parallel circuit, each member of said sequence except the first being responsive to said resonant frequency output only for the interval of time during which the immediately preceding member of said sequence changes the reactance as said, and a coincidence point connected to said parallel circuit and to the last member of said sequence for obtaining an output signal from the resonant frequency output signal of said parallel circuit only for the interval of time during which said last member changes the degree of saturation of said saturable core reactor as said.

2. A permutation coding circuit comprising, a magnetic core inductive winding, a capacitance connected to form a parallel circuit with at least a portion of said winding, means for applying incoming signals to said parallel circuit, a sequence of serially connected means for producing gating voltages each connected to said parallel circuit and each, except the first, operatively responsive to the resonant frequency output of said parallel circuit only for the duration of the gating voltage produced by the immediately preceding member in said sequence, a plurality of direct current controlling means each connected to a respective member of said sequence and operative responsively to the gating voltage of the member to which connected to alter the incremental inductance of said winding, and coincidence tube means connected to said parallel circuit and to the last member in said sequence operative responsively to the resonant frequency output of said parallel circuit to produce an output signal only for the duration of the gating voltage produced by said last member.

3. A permutation coding circuit comprising, a magnetic core inductance, a capacitance connected to form a parallel circuit with at least a portion of said inductance, means for applying incoming signals to said parallel circuit, a sequence of serially connected multivibrator means for producing gating voltages each connected to said parallel circuit and each except the first operatively responsive to the resonant frequency output of said parallel circuit only for the duration of the gating voltage produced by the immediately preceding multivibrator means in said sequence, a source of current, a plurality of direct current controlling means each connected in series with said source of current and at least a portion of said inductance and to a respective one of said multivibrator means and each operatively responsive to the gating voltage of the multivibrator means to which connected, and coincidence tube means connected to said parallel circuit and to the last multivibrator means in said sequence operative responsively to the resonant frequency output of said parallel circuit to produce an output signal only for the duration of the gating voltage produced by said last multivibrator means.

4. A permutation coding circuit comprising, a magnetic core inductance having a plurality of discrete magnetically linked windings, a capacitance connected to form a parallel circuit with one of said windings, means for applying incoming signals to said parallel circuit, a sequence of serially connected multivibrator means for producing gating voltages each connected to said parallel circuit and each, except the first, operatively responsive to the resonant frequency output of said parallel circuit only for the duration of the gating voltage produced by the immediately preceding multivibrator means in said sequence, a source of current, a plurality of direct current controlling means each connected in series with said source of current and to a respective one of the remaining windings of said plurality and to a respective one of said multivibrator means and each operatively responsive to the gating voltage of the multivibrator means to which connected, and coincidence tube means connected to said parallel circuit and to the last multivibrator means in said sequence operative responsively to the resonant frequency output of said parallel circuit to produce an output signal only for the duration of the gating voltage produced by said last multivibrator means.

5. A permutation coding circuit comprising a magnetic core inductance having at least three discrete magnetically linked windings, a capacitance connected to form a parallel circuit with the first of said windings, means for applying incoming signals to said parallel circuit, a first multivibrator means connected to said parallel circuit for producing a first gating voltage of predetermined duration in response only to the resonant frequency output of said parallel circuit, a source of current, direct current control means connected in series with said source of current and the second of said windings and to said first multivibrator means operatively responsive to said first gating voltage, a second multivibrator means connected to said parallel circuit and to said first multivibrator means for producing a second gating voltage of predetermined duration in response to the resonant frequency output of said parallel circuit only for the duration of said first gating voltage, direct current control means connected in series with said source of current and the third of said windings and to said second multivibrator means operatively responsive to said second gating voltage, and coincidence tube means connected to said parallel circuit and to said second multivibrator means operative responsively to the resonant frequency output of said parallel circuit to produce an output signal only for the duration of said second gating voltage.

6. A permutation coding circuit comprising a magnetic core inductance having at least three discrete magnetically linked windings, a capacitance connected to form a parallel circuit with the first of said windings, means for applying incoming signals to said parallel circuit, a first vacuum tube keying means connected to said parallel circuit for producing a keying signal in response only to the resonant frequency output of said parallel circuit, a first multivibrator connected to said first keying means for producing a first gating voltage of predetermined duration in response only to the output of said keying means, a source of current, direct current control means connected in series with said source of current and the second of said windings and to said first multivibrator operatively responsive to said first gating voltage, a second vacuum tube keying means connected to said parallel circuit and to said first multivibrator for producing a keying signal only in response to the coincidental occurrence of said first gating voltage and the resonant frequency output of said parallel circuit, a second multivibrator connected to said second keying means for producing a second gating voltage of predetermined duration in response only to the output of said second keying means, direct current control means connected in series with said source of current and the third of said windings and to said second multivibrator operatively responsive to said second gating voltage, and coincidence tube means connected to said parallel circuit and to said second multivibrator for producing an output signal only in response to the coincidental occurrence of said second gating voltage and the resonant frequency output of said parallel circuit.

7. A permutation coding circuit comprising a magnetic core inductive winding, a capacitance connected to form a parallel circuit with said winding, means for applying incoming signals to said parallel circuit, a sequence of serially connected multivibrator means for producing gating voltages each connected to said parallel circuit and each, except the first, operatively responsive to the resonant frequency output of said parallel circuit only for the duration of the gating voltage produced by the immediately preceding multivibrator means in said sequence, a source of current, a plurality of direct current controlling means connected in parallel one with the other and each in series between said source of current and said inductive winding, each of said direct current controlling means also being connected to a respective one of said multivibrator means and being operatively responsive to the gating voltage of the multivibrator means to which connected, and coincidence tube means connected to said parallel circuit and to the last multivibrator means in said sequence operative responsively to the resonant frequency output of said parallel circuit to produce an output signal only for the duration of the gating voltage produced by said last multivibrator means.

CONRAD H. HOEPPNER.

REFERENCES CITED

The following references are of record in the file of this patent:

UNITED STATES PATENTS

| Number | Name | Date |
|---|---|---|
| 1,547,226 | Martin | July 28, 1925 |
| 2,330,216 | Hoover et al. | Sept. 28, 1943 |
| 2,394,786 | Korneke | Feb. 12, 1946 |

FOREIGN PATENTS

| Number | Country | Date |
|---|---|---|
| 172,321 | Great Britain | Nov. 2, 1922 |
| 393,327 | Great Britain | June 8, 1933 |
| 444,316 | Great Britain | Mar. 18, 1936 |